United States Patent
Bauer et al.

(10) Patent No.: US 6,254,126 B1
(45) Date of Patent: Jul. 3, 2001

(54) DEVICE AND METHOD FOR DETECTING THE WEIGHT OF AN OBJECT AND/OR AN OCCUPANT ON A VEHICLE SEAT

(75) Inventors: Hans-Peter Bauer, Regensburg; Günter Heitzer, Pfatter; Marten Swart, Obertraubling; Peter Popp, Regensburg; Gerhard Danz, Würzburg; Galtano Origlio, Trebur; Ulrich Kippelt, Mutlangen; Markus Frisch, Regensburg, all of (DE)

(73) Assignees: Siemens Aktiengesellscaft, Munich; Allied-Signal Automotive Abt. SRS, Raunheim; Breed Siemens Restraint Systems GmbH, Alzenau, all of (DE)

( * ) Notice: Subject to any disclaimer, the term of this patent is extended or adjusted under 35 U.S.C. 154(b) by 0 days.

(21) Appl. No.: 09/500,418

(22) Filed: Feb. 8, 2000

Related U.S. Application Data

(63) Continuation of application No. PCT/DE98/02233, filed on Aug. 4, 1998.

(30) Foreign Application Priority Data

Aug. 8, 1997 (DE) ............................................... 197 34 508

(51) Int. Cl.$^7$ .................................................... B60R 21/32
(52) U.S. Cl. ............................................. 280/735; 701/45
(58) Field of Search ............................... 280/735; 701/45

(56) References Cited

U.S. PATENT DOCUMENTS

| | | | |
|---|---|---|---|
| 5,670,853 | * 9/1997 | Bauer | 318/286 |
| 5,748,473 | * 5/1998 | Breed et al. | 364/424.055 |
| 6,069,325 | * 5/2000 | Aoki | 177/136 |
| 6,087,598 | * 7/2000 | Munch | 177/144 |
| 6,113,139 | * 9/2000 | Heximer et al. | 280/735 |

FOREIGN PATENT DOCUMENTS

| | | |
|---|---|---|
| 34 28 585 A1 | 2/1986 | (DE). |
| 42 37 072 C1 | 12/1993 | (DE). |
| 44 42 841 A1 | 6/1995 | (DE). |
| 195 11 591 A1 | 10/1996 | (DE). |
| 0 644 407 A2 | 3/1995 | (EP). |
| 0 730 992 A2 | 9/1996 | (EP). |

OTHER PUBLICATIONS

Japanese Patent Abstract No. 59135325 (Hiroaki), dated Aug. 3, 1984.
Japanese Patent Abstract No. 01252983 (Shiro), dated Oct. 9, 1989.
Japanese Patent Abstract No. 02012407 (Akihito), dated Jan. 17, 1990.
Japanese Patent Abstract No. 07218326 (Takehiko), dated Aug. 18, 1995.
"Weight Sensing for Occupant Restraint System Utilizing Load Cell Technologies", XP–00726567.

* cited by examiner

*Primary Examiner*—Eric Culbreth
*Assistant Examiner*—L. Lum
(74) *Attorney, Agent, or Firm*—Herbert L. Lerner; Laurence A. Greenberg; Werner H. Stemer

(57) ABSTRACT

A device and a method for detecting a weight of an object and/or an occupant on a vehicle seat are described. In which a control and evaluation circuit derives a weight signal from a current consumed by an electric motor during a controlled adjustment of the vehicle seat.

10 Claims, 3 Drawing Sheets

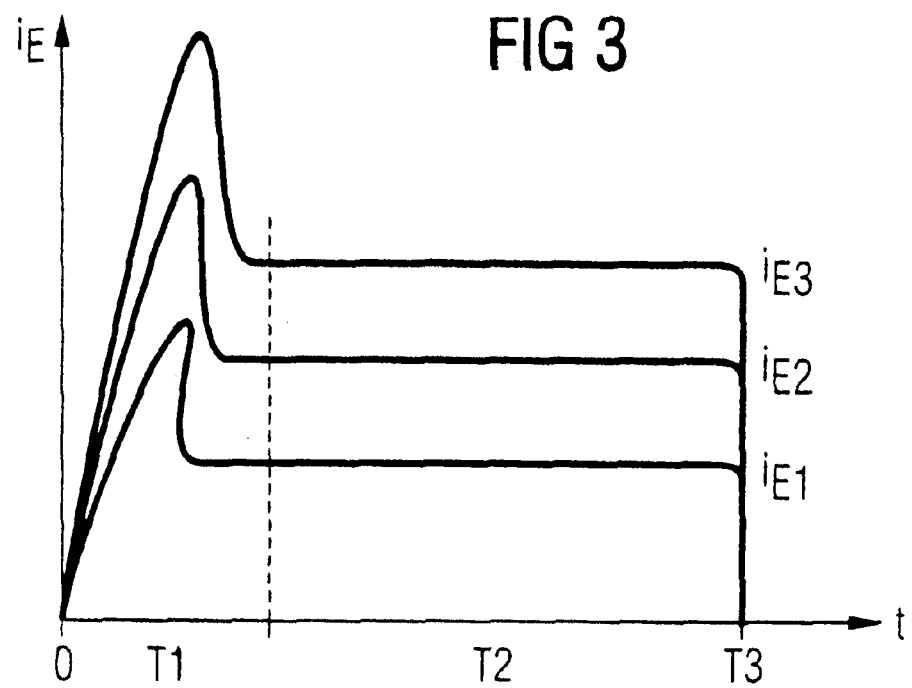
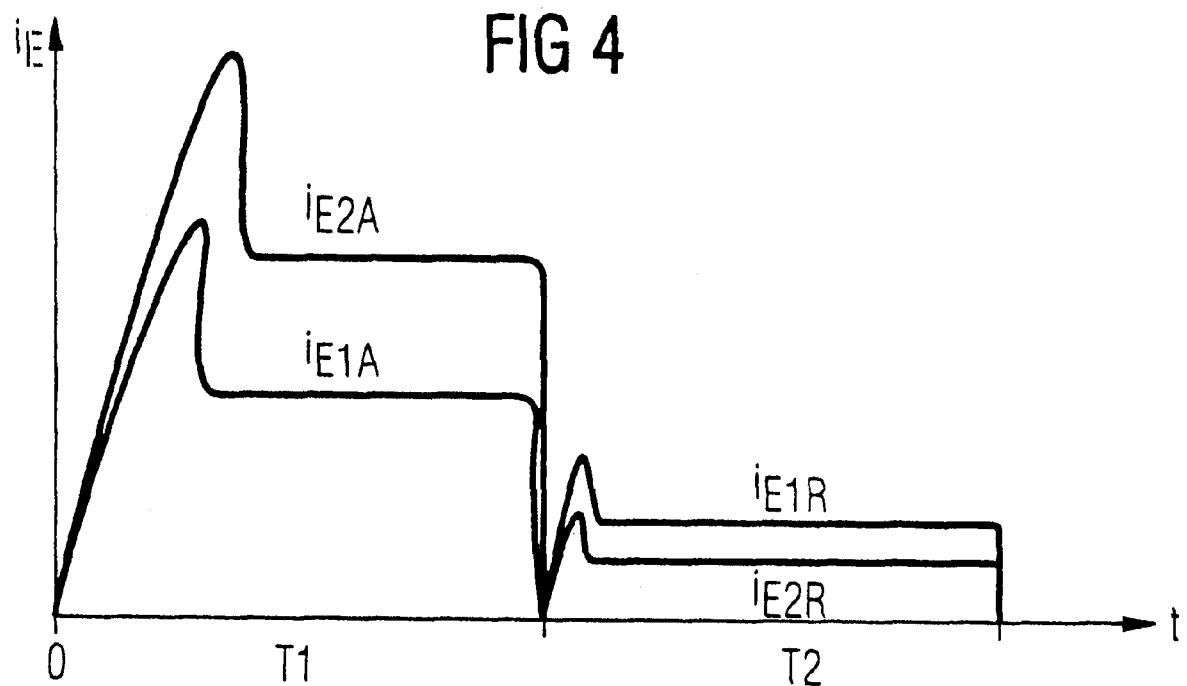

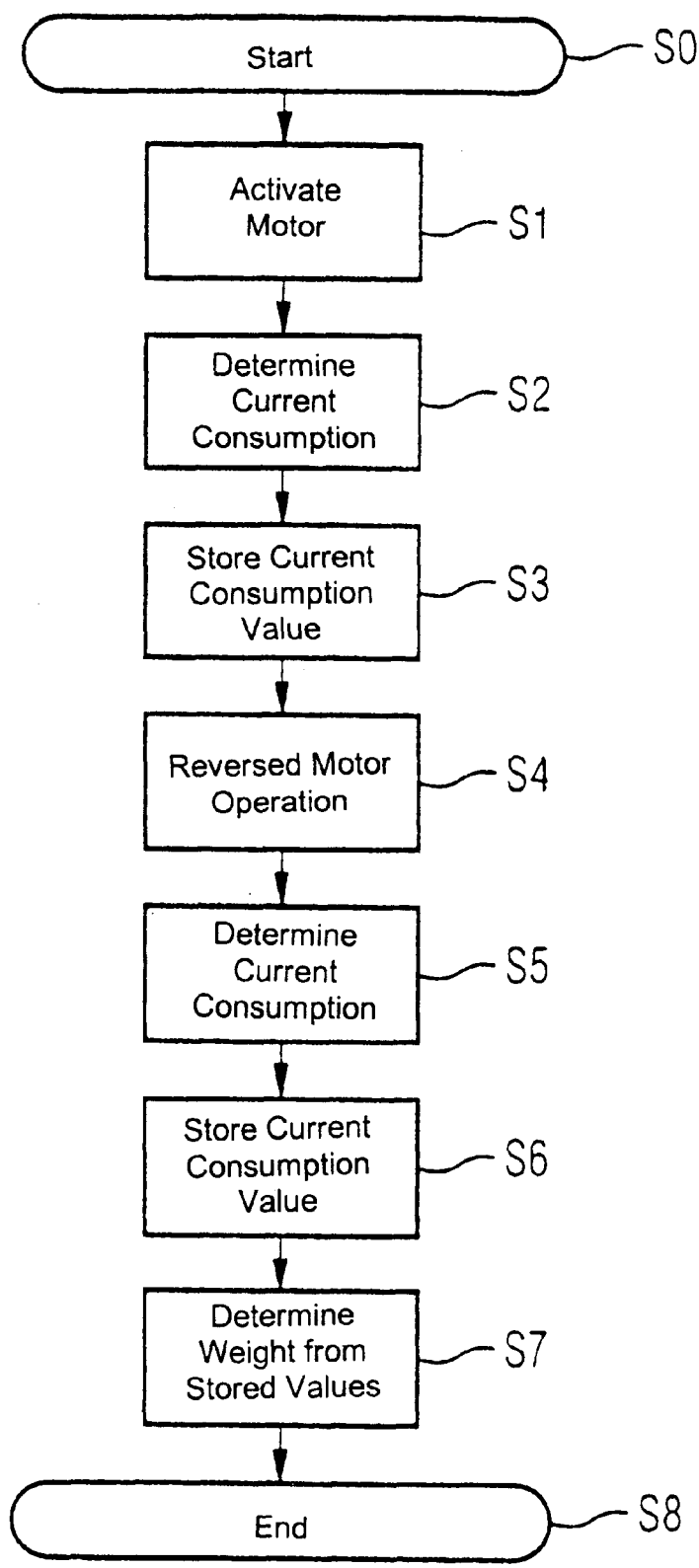

US 6,254,126 B1

DEVICE AND METHOD FOR DETECTING THE WEIGHT OF AN OBJECT AND/OR AN OCCUPANT ON A VEHICLE SEAT

CROSS-REFERENCE TO RELATED APPLICATION

This is a continuation of copending International Application PCT/DE98/02233, filed Aug. 4, 1998, which designated the United States.

BACKGROUND OF THE INVENTION

Field of the Invention

The invention relates to a device and a method for detecting a weight of an object and/or an occupant on a vehicle seat.

Occupant protection systems in motor vehicles according to the prior art have, in addition to an impact detecting device have an occupant position detecting device and a weight detecting device for occupants or objects on the vehicle seat. Information about the position and weight of the occupant or, for example, a child seat, is intended to achieve the measured inflation of associated air bags which is matched to the occupant.

A known device for weight detection for a motor vehicle (see Published, Non-Prosecuted German Patent Application DE 42 37 072 A1) contains a sheet pressure sensor in the form of a mat, whose electrical resistance decreases with increasing pressure on a surface of the sheet. The mat is incorporated into the seat upholstery surface of the seat.

SUMMARY OF THE INVENTION

It is accordingly an object of the invention to provide a device and a method for detecting the weight of an object and/or an occupant on a vehicle seat that overcome the above-mentioned disadvantages of the prior art methods and devices of this general, which has simple construction.

With the foregoing and other objects in view there is provided, in accordance with the invention, a device for detecting a weight of an object, including a vehicle seat for receiving the objected to be weighed; a controllable electric motor for adjusting the vehicle seat; a sensor for registering a measured variable dependent on a force supplied by the controllable electric motor; and a control and evaluation circuit deriving a weight signal from the measured variable registered during a controlled adjustment of the vehicle seat.

According to the invention, the force output in order to adjust the vehicle seat by an electric motor provided for the seat adjustment is a measure of the weight force—weight in the following text—moved by the electric motor. In this case, the weight moved is composed of the weight of the vehicle seat, the frictional force to be overcome and the weight of an occupant on the vehicle seat or of an object disposed on the vehicle seat. In order to determine the force output by the electric motor, the sensor is provided which registers a measured variable that depends on the force supplied by the electric motor and therefore on the weight moved by the electric motor. The control and evaluation circuit subsequently derives the weight signal from the measured variable registered during the controlled adjustment of the vehicle seat.

The measured variable registered is preferably a current consumed by the electric motor, a rotational speed of the electric motor or a torque of the electric motor.

For the purpose of the controlled adjustment of the electric motor, the control and evaluation circuit controls the electric motor with the effect that the electric motor is set moving. It is not necessary for the position of the vehicle seat also to be adjusted in a manner that is noticeable to the occupant. The electric motor should preferably be operated beyond its starting current phase, in order to be able to register the respective measured variable in the steady state, the transient phase of the measured variable as the electric motor is switched on or off not being taken into account by the control and evaluation circuit when the measured variable is evaluated. About five revolutions of the electric motor are sufficient for this purpose. During the controlled adjustment of the vehicle seat in this way, the current drawn by the electric motor is preferably registered and evaluated by the control and evaluation circuit.

It is preferable for the device for detecting the weight to make use of an electric motor for adjusting the height of the seat. Alternatively, however, an electric motor for adjusting the seat longitudinally can also be used. In any case, the electric motor must adjust the vehicle seat against the weight of the occupant.

In order to detect the weight, use is preferably made of electric motors that are already disposed in a vehicle seat for adjusting the seat position. In this case, apart from the sensor for registering the current and the control and evaluation circuit, no additional components are needed for detecting the weight. In particular, no sensor that has a large area and is associated with some intervention in the vehicle seat structure is needed. The current sensor and the control and evaluation circuit can simply be connected to the electric motor in or on the vehicle seat, since in the case of an electrically adjustable vehicle seat, mechanical and electrical interfaces for the electric motor are already provided in or on the vehicle seat. Furthermore, the drive electronics that already exist for adjusting the vehicle seat can simply be expanded, in software or hardware terms, by the control and evaluation circuit of the weight detecting device.

Other features which are considered as characteristic for the invention are set forth in the appended claims.

Although the invention is illustrated and described herein as embodied in a device and a method for detecting the weight of an object and/or an occupant on a vehicle seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph showing a current consumption over time of an electric motor which is provided for adjusting the vehicle seat, in the case of different weights disposed on the vehicle seat;

FIG. 4 is a graph showing a current variation over time of the electric motor during the adjustment of the vehicle seat first in one direction and then in an opposite direction, in the case of different weights disposed on the vehicle seat; and FIG. 5 is a flow chart for a method according to the invention.

DESCRIPTION OF THE PREFERRED EMBODIMENTS

Figure 1:
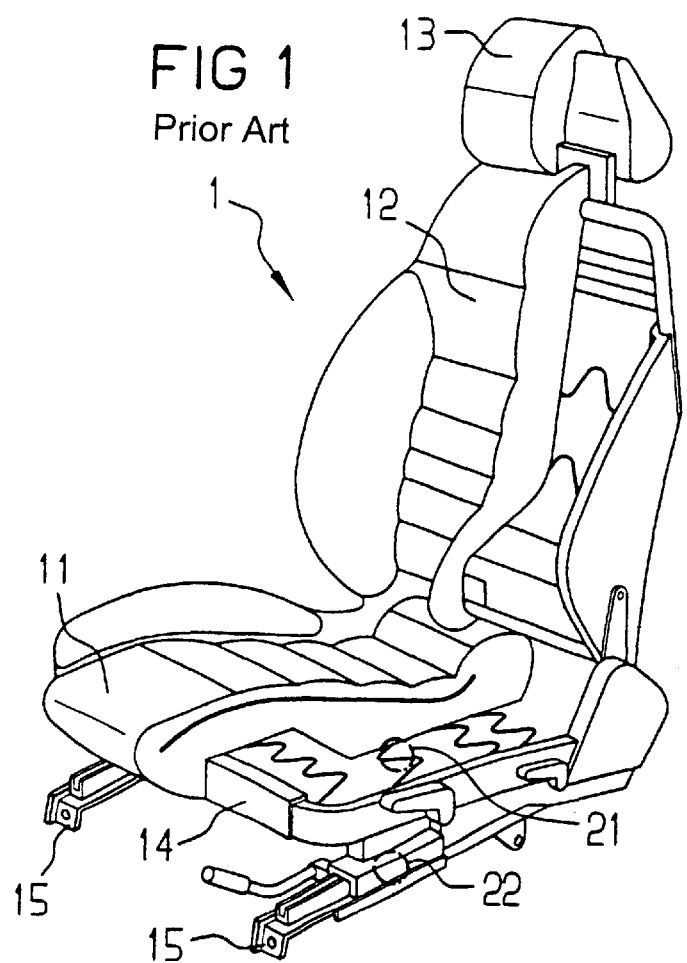
FIG. 1 is a diagrammatic, perspective, partially cut-away view of a typical motor vehicle seat.

In all the figures of the drawing, sub-features and integral parts that correspond to one another bear the same reference symbol in each case. Referring now to the figures of the drawing in detail and first, particularly, to FIG. 1 thereof, there is shown a typical vehicle seat 1. The seat 1 has a seat cushion 11, a backrest 12, a headrest 13 and a seat frame 14. The vehicle seat 1 is displaceably mounted on sliding rails 15. Increasingly, vehicle seats may be adjusted not only by mechanical operation but also by electrical operation.

As a symbol of this, an electric motor 21 for a seat height adjustment, and an electric motor 22 for a seat longitudinal adjustment along the slide rails 15 have been drawn in FIG. 1. By pressing on a push-button, the occupant activates the appropriate electric motors 21, 22 in such a way that the vehicle seat 1 is displaced under control into a desired position.

Figure 2:
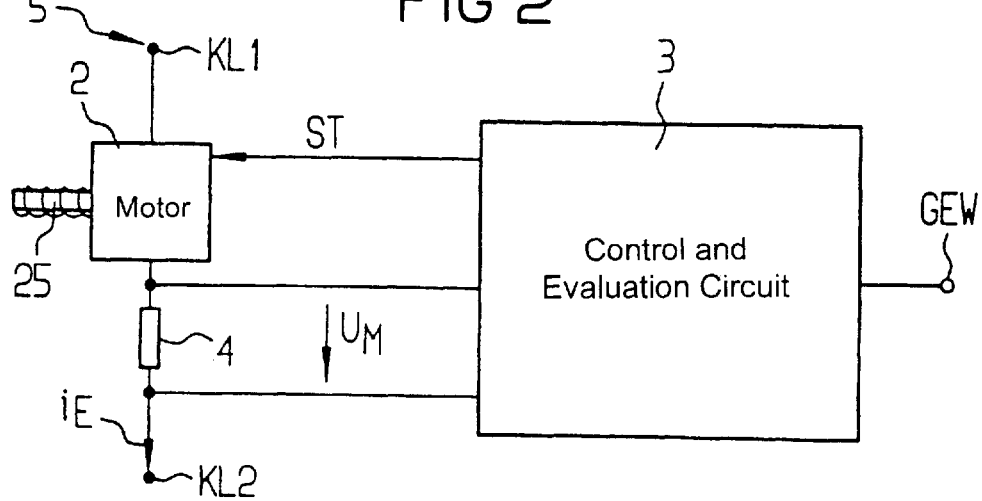
FIG. 2 is a block diagram of a device according to the invention.

FIG. 2 shows a block diagram of a device according to the invention. An electric motor 2, with its symbolically drawn rotor 25, is used to adjust the vehicle seat 1 according to FIG. 1. It is connected to terminals KL1 and KL2 of a power supply source 5. A control and evaluation circuit 3 controls the electric motor 2 via a control signal ST. A current sensor 4 in the form of a measuring resistor registers a current $i_E$ consumed by the electric motor 2, a measured voltage $U_M$ dropped across the resistor 4 is registered by the control and evaluation circuit 3 in order to determine the current consumption. Using the registered current $i_E$, the control and evaluation circuit 3 outputs a weight signal GEW, which is either proportional to the determined weight or has already been classified by the control and evaluation circuit 3 and, for a determined weight, lies within a defined weight interval. The control and evaluation circuit 3 is preferably a microprocessor, but can also be represented by an analog circuit or constructed as any other measurement and control circuit.

FIG. 3 shows the current variation over time of the current $i_E$ consumed by the electric motor 2 during the controlled adjustment of the vehicle seat 1. In the case of the registered current curve $i_{E1}$, no object/occupant/weight is disposed on the vehicle seat 1. In the case of the current curve $i_{E2}$ a low weight is disposed on the vehicle seat 1 and in the case of the current curve $i_{E3}$ a relatively large weight is disposed on the vehicle seat 1. In general, each current curve $i_{Ei}$ measured after the activation of the electric motor 2 is characterized by a first time interval T1 for a starting phase of the electric motor 2. At the same time, an overswing in the current curve $i_E$ can be seen. Following the starting phase, the current curve $i_E$ is characterized by an approximately constant, steady-state operating current during the time interval T2. At these times, the electric motor 2 adjusts the vehicle seat 1 continuously while consuming an approximately constant, steady-state operating current, whose amplitude, in particular, depends on the weight. At the time T3 according to FIG. 3, the adjustment of the vehicle seat 1 is terminated by an appropriate control signal ST, for example. The controlled adjustment for detecting the weight is thereby concluded. The electric motor 2 can of course readily continue to be operated, in order for example to match the desire of the occupant for an adjustment of the vehicle seat 1.

The controlled adjustment of the vehicle seat 1 for detecting the weight is preferably brought about each time the vehicle is put into service, that is to say following the operation of the vehicle ignition, since at this time it can already be assumed that occupants have taken their place in the vehicle. The measurement for detecting the weight is preferably repeated at defined intervals during the operation of the vehicle, in order to be able to establish changes to the weight force acting on a vehicle seat 1.

The control and evaluation circuit 3 carries out, for example, the following evaluation of the registered, steady-state operating current $i_{E1}$: a steady-state operating current, for example $i_{E2}$, recorded on the basis of a measurement is compared with a stored steady-state operating current $i_{E1}$ by forming the difference. The operating current value $i_{E1}$ stored in an EPROM in the control and evaluation circuit 3 corresponds to the current consumption of the electric motor 2 for adjusting an unoccupied vehicle seat 1. This difference signal is then supplied by the control and evaluation circuit 3 as the weight signal GEW. The difference signal can preferably be further compared, in the control and evaluation circuit 3, with different threshold values, so that as a result a classified weight signal GEW is supplied by the control and evaluation circuit 3.

The weight signal GEW is preferably formed as the difference between two measured steady-state operating currents $i_{Ei}$. According to FIG. 4, in a first time interval T1, the electric motor 2 is controlled by the control and evaluation circuit 3 in such a way that the vehicle seat 1 is adjusted in a first predefined direction. The current consumption $i_{E1A}$ in this case identifies the current variation when the vehicle seat 1 is unoccupied, the current $i_{E2A}$, on the other hand, identifies the current variation when the vehicle seat 1 is occupied. In a time interval T2, following the time interval T1, the control and evaluation circuit 3 causes the electric motor 2 to be controlled with the effect that it adjusts the vehicle seat 1 in a second direction which is opposite to the first direction. If, for example, during the time interval T1, the vehicle seat 1 is lifted via the electric-motor height adjustment, then it is lowered again in the time interval T2. In the process, the current $i_{E1R}$ identifies the current variation when the vehicle seat 1 is not occupied, the current $i_{E2R}$, on the other hand, identifies the current curve when the vehicle seat 1 is occupied. If a greater current consumption by the electric motor 2 is needed to lift an occupied vehicle seat 1 than when the vehicle seat 1 is unoccupied, then a lower current consumption is needed during the lowering of the occupied vehicle seat 1 than in the case of an unoccupied vehicle seat 1, since here the weight of the occupant assists the electric motor in its downward movement.

If now the difference between the current consumption and, in particular, the quiescent current in the time interval T1 and in the time interval T2 is formed, then the difference signal, as the weight signal GEW, is in particular independent of zero-point and offset errors of the control and evaluation circuit 3. Furthermore, the frictional forces to be overcome during the adjustment of the seat 1 are automatically averaged out because of the formation of the difference. The weight of the occupant or the object, which is actually to be determined, is included in the difference signal by the factor If necessary, the starting current can also be used for calculating the weight signal GEW.

FIG. 5 shows a flow diagram with sequential method steps for the method according to the invention for detecting the weight of an object and/or an occupant on the vehicle seat 1. After the start at step S0, the electric motor 2 is activated by the control and evaluation circuit 3 at step S1. During the adjustment operation of the electric motor, at step S2 the adjusting current consumed by the electric motor 2 is determined and, at step S3, is stored in a memory in the control and evaluation circuit 3. After the electric motor 2 has been switched off, at step S4 a control signal is supplied to the electric motor 2, which effects the adjustment of the vehicle seat 1 in the opposite direction. At step S5, the current consumption of the electric motor 2 is measured again. At step S6, this determined current consumption is stored in the memory in the control and evaluation circuit 3 before, at step S7, the weight force acting on the vehicle seat 1 is determined from the stored current values. At step S8, the method is concluded.

We claim:

1. A device for detecting a weight of an object, comprising:
    a vehicle seat for receiving the object to be weighed;
    a controllable electric motor for adjusting said vehicle seat;
    a sensor for registering a steady-state operating current dependent on a force supplied by said controllable electric motor; and
    a control and evaluation circuit deriving a weight signal from the steady-state operating current registered during a controlled adjustment of said vehicle seat.

2. The device according to claim 1, wherein said sensor registers a current consumption of said controllable electric motor and the weight signal is derived by said control and evaluation circuit from the current registered during the controlled adjustment of said vehicle seat.

3. The device according to claim 1, wherein said sensor registers a torque of said controllable electric motor and the weight signal is derived by said control and evaluation circuit from the torque registered during the controlled adjustment of said vehicle seat.

4. The device according to claim 1, wherein said controllable electric motor adjusts a height of said vehicle seat.

5. A device for detecting a weight of an object, comprising:
    a vehicle seat for receiving the object to be weighed;
    a controllable electric motor for adjusting said vehicle seat;
    a sensor for registering a measured variable dependent on a force supplied by said controllable electric motor, said sensor configured to register a rotational speed of said controllable electric motors; and
    a control and evaluation circuit deriving a weight signal from said rotational speed registered during the controlled adjustment of said vehicle seat.

6. A device for detecting a weight of an object, comprising:
    a vehicle seat for receiving the object to be weighed;
    a controllable electric motor for adjusting said vehicle seat;
    a sensor for registering a measured variable dependent on a force supplied by said controllable electric motor; and
    a control and evaluation circuit deriving a weight signal from a difference between the measured variable registered during a controlled adjustment of said vehicle seat in a first direction and a further measured variable registered during a further controlled adjustment of said vehicle seat in a second direction opposite to the first direction.

7. The device according to claim 6, wherein in each case a steady-state operating current is used to determine the weight signal.

8. A control device for an occupant protection device in a motor vehicle, comprising:
    a vehicle seat; and
    a device for detecting a weight of an object on said vehicle seat, said device including:
        a controllable electric motor for adjusting said vehicle seat;
        a sensor for registering a measured variable dependent on a force supplied by said controllable electric motor; and
        a control and evaluation circuit deriving a weight signal from the measured variable registered during a controlled adjustment of said vehicle seat, in which intentional triggering of the occupant protection device being prevented or a measured triggering of the occupant protection device being initiated at least as a function of the weight signal supplied by said device for detecting the weight.

9. A method of detecting a weight of an object, including an occupant, on a vehicle seat, which comprises:
    adjusting the vehicle seat via an electric motor;
    registering a measured variable which depends on a force supplied by the electric motor; and
    deriving a weight signal from the measured variable registered during the adjusting of the vehicle seat.

10. The method according to claim 9, which comprises deriving the weight signal from a difference between the measured variable which is registered during the adjusting and registering steps of the vehicle seat adjusted in a first direction and a further measured variable registered during a further controlled adjustment of the vehicle seat in a second direction opposite to the first direction.

* * * * *